US007103365B2

United States Patent
Myllymaki

(10) Patent No.: US 7,103,365 B2
(45) Date of Patent: Sep. 5, 2006

(54) SYSTEM AND METHOD FOR LOCATING AN ALTERNATE COMMUNICATION MECHANISM IN CASE OF A FAILURE OF A WIRELESS COMMUNICATION DEVICE

(75) Inventor: Jussi Petri Myllymaki, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 829 days.

(21) Appl. No.: 09/788,502

(22) Filed: Feb. 21, 2001

(65) Prior Publication Data

US 2002/0115445 A1 Aug. 22, 2002

(51) Int. Cl.
*H04Q 7/20* (2006.01)
*H04Q 7/38* (2006.01)

(52) U.S. Cl. .............. 455/456.1; 455/456.2; 455/456.3; 455/456.4; 455/456.5; 455/404.1; 455/404.2; 455/422.1; 340/539.1; 340/539.11; 340/539.13

(58) Field of Classification Search ............ 455/404.1, 455/404.2, 403, 423.1, 456.1–457, 414.1, 455/414.2, 414.4, 517, 422.1, 412.1, 414.3, 455/435.1, 435.2, 550.1, 556.1, 556.2, 445, 455/500, 512, 573, 574, 434; 340/539, 531, 340/539.11, 539.13
See application file for complete search history.

(56) References Cited

U.S. PATENT DOCUMENTS

| 5,613,213 | A | * | 3/1997 | Naddell et al. | .......... 455/435.2 |
| 6,167,253 | A | * | 12/2000 | Farris et al. | .......... 455/412.2 |
| 6,223,037 | B1 | * | 4/2001 | Parkkila | .......... 455/434 |
| 6,574,484 | B1 | * | 6/2003 | Carley | .......... 455/521 |
| 6,847,823 | B1 | * | 1/2005 | Lehikoinen et al. | .......... 455/456.1 |
| 2002/0022488 | A1 | * | 2/2002 | Srinivasan et al. | .......... 455/456 |

* cited by examiner

*Primary Examiner*—Keith Ferguson
(74) *Attorney, Agent, or Firm*—Leonard Guzman, Esq.; McGinn IP Law Group, PLLC

(57) ABSTRACT

A system (and method and programmable storage medium for storing program steps of the method) for locating an alternate communication mechanism in case of a failure of a wireless device, includes a location tracker for continuously transmitting information to the wireless communication device for allowing a user to locate an alternate communication mechanism after the failure has occurred.

32 Claims, 3 Drawing Sheets

SYSTEM AND METHOD FOR LOCATING AN ALTERNATE COMMUNICATION MECHANISM IN CASE OF A FAILURE OF A WIRELESS COMMUNICATION DEVICE

BACKGROUND OF THE INVENTION

1. Field of the Invention

The present invention generally relates to a system and method for locating an alternate communication mechanism, and more particularly to a system and method for locating an alternate communication mechanism in the case of a failure of a wireless communication device.

2. Description of the Related Art

Rapid advances are being made in the field of wireless communication. An increasing number of applications are being developed for the wireless device platform, ranging from "smart" cellular phones to two-way text pagers. Shortly, (in 2001), new cellular phones will be required to have a location-tracking device based on the global positioning system (GPS). This gives rise to systems that deliver real-time, location-based information and services to wireless subscribers.

Services provided over a wireless network are extremely convenient because they are available to the user independent of location. However, wireless connectivity is not available everywhere.

Indeed, isolated blind spots exist in many networks (e.g., cellular and the like), and moving away from populated areas makes the situation even worse. In addition, wireless handset devices consume power and must be recharged periodically. In many situations, recharging is impossible due to lack of electricity or appropriate converters or adaptors.

As consumers begin to depend on wireless devices more and more, it is important to have a safety net which allows use of alternate communication mechanisms if the wireless device fails.

However, the problem is that loss of network coverage or battery power can occur suddenly and unexpectedly. Once the event occurs, it is very difficult to find an alternate communication mechanism.

Presently, there is no mechanism for solving this problem by proactively and continuously transmitting information to the wireless communication device that helps the user locate an alternate mechanism.

SUMMARY OF THE INVENTION

In view of the foregoing and other problems, drawbacks and disadvantages of the conventional systems and methods, an object of the invention is to provide a structure and method for locating an alternate communication mechanism.

Another object is to provide a system and method for locating an alternate communication mechanism in the case of a failure of a wireless communication device.

In a first aspect, a system (and method and programmable storage medium for storing program steps of the method) for locating an alternate communication mechanism in case of a failure of a wireless device, includes a location tracker for continuously transmitting information to the wireless communication device for allowing a user to locate an alternate communication mechanism after the failure has occurred.

In a second aspect, a method according to the present invention, for locating an alternate communication mechanism in case of a failure of a wireless device, includes monitoring, by a wireless service provider, location coordinates of a wireless device of a user, based on the location coordinates, consulting at least one database to find at least one candidate resource for assisting the user, selecting a best candidate resource from the at least one candidate resource to provide a predetermined alternate communication mechanism for the user, and forwarding the information to the wireless device of the user.

With the unique and unobvious aspects of the invention, even if communication fails on a wireless device, information regarding a nearest alternate communication mechanism can be displayed to a user, and the user can travel to the nearest alternate communication mechanism and the failed device can be recharged and/or the failed communication can be completed.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
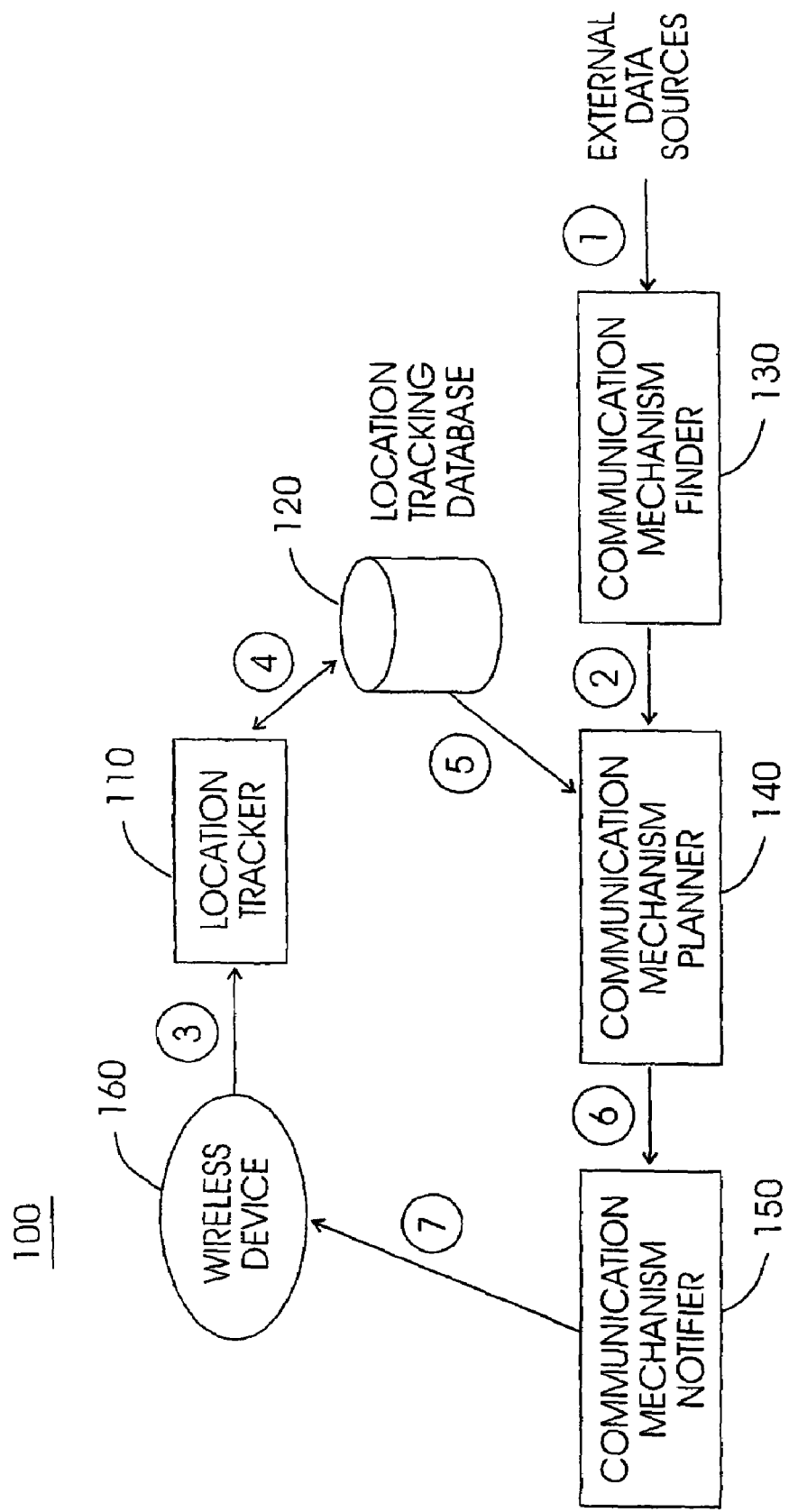
FIG. 1 is a schematic diagram of a system 100, according to the present invention, for locating an alternate communication in the case of a failure of a wireless communication device.

Referring now to the drawings, and more particularly to FIGS. 1–4, a preferred embodiment of the present invention will be described.

Generally, the present invention solves the above and other problems of the conventional systems and methods by proactively and continuously transmitting information to the wireless communication device that helps the user locate an alternate communication mechanism (e.g., the nearest such mechanism).

The present inventor has recognized that, while a considerable amount of battery power is required for the wireless device to transmit signals, it takes very little power to display the information on a liquid crystal display (LCD) or the like, or to play it through a speaker.

Therefore, even though the wireless device may have lost its capability to transmit signals, it can still display information that was received prior to the failure. The information may include directions to the nearest pay phone, the nearest house or facility, the nearest location offering wireless coverage and/or recharging facilities, etc.

The invention is based on the capability of the wireless network to track the location of the user and transmit ("push") data to the user's wireless device. As the user moves, his/her location is updated in the location database and information on alternate communication mechanisms is gathered automatically (e.g., without any user input) and transmitted to the user's wireless device).

Turning now to FIG. 1, an architecture of a system 100 according to the present invention is shown.

Briefly, the inventive system 100 includes a Location Tracker 110, a Location Tracking Database 120, a Communication Mechanism Finder 130, a Communication Mechanism Planner 140, and a Communication Mechanism Notifier 150. The system is for use with a wireless device 160 of a user.

The Location Tracker 110 is responsible for retrieving the location information of each user and storing it in the Location Tracking Database 120. Software in the wireless device of the user is modified so that it periodically sends its location coordinates (latitude and longitude) (e.g., its global positioning system coordinates) to the Location Tracker 110. The information is marked with a timestamp and stored in the Database 120.

It is noted that the invention is not limited to the GPS location systems or services and other location tracking schemes/protocols can be employed.

For example, the signal strengths of a user's device could be measured from a plurality of different stations (e.g., base station towers or the like) and triangulation could be used to find the user's approximate location.

Another locating tracking system could be one used, for example, currently in a vehicle. Such a location tracking device may include a GPS receiver and have a cellular phone integrally built therein (e.g., shares the same housing as the GPS). Such an arrangement is an autonomous unit which receives the GPS coordinates from the GPS receiver and then automatically transmits the coordinates.

Yet another location tracking system which could be employed is one which provides wireless connectivity (e.g., wireless e-mail and the like) such as for example that used in Personal Data Assistants (PDAs). Such a system may obtain the name/identification of the tower with whom it is communicating with and sends the tower identification with any message. A database can be maintained in which the tower identification is associated with the location of where the tower is located (e.g., the city where the wireless device is located; alternatively a special database could be tailored to associate the GPS coordinates with the tower, etc.). However, such a location tracking system is not optimally accurate since the location of the user is not pinpointed, but rather just the city or location where the tower is located or the like.

Yet another location tracking system which could be employed is one used with a wireless computer network (e.g., such as an Ethernet®) used to connect various computer terminals in the network having base stations. In such a system, a user may have a laptop which communicates with the base stations, and which moves around an area (e.g., a building or the like). As the laptop is moved around the area, the laptop seamlessly switches from one base station to another, thereby providing a location of the laptop (e.g., to the nearest base station with which it is communicating) within the network. Thus, location reports can be generated in which the laptop's location can be identified, since the name of the base station can be identified. Thus, in the first instance, the location data is the base station name, and in the second instance the location (e.g., GPS coordinates or the like) of each base station is known.

Thus, many location tracking schemes could be used, with the invention not necessarily being limited to the specific mechanism or system of GPS or the physical location scheme of longitude and latitude. Network location methods (e.g., knowing the name of a computer in a network and then translating the name to a physical location address) and the like, as described above, could be employed. Hence, various location reports could be maintained such as an address report/database (e.g., similar to a home mailing address including a city name, state name, etc. which can be translated into a physical longitude/latitude report or the like). Similarly, if a distance must be computed between two points, which is important for the present invention, then an alternative location report must be converted into a physical (latitude/longitude) reports.

In sum, it is noted that such methods can be used but are not currently as accurate as GPS, and thus GPS is the preferred location tracking method currently and the primary mechanism for acquiring physical coordinates data. Hence, for ease of the reader's understanding only, GPS will be described and assumed below. By the same token, it is further noted that once the coordinate data is acquired, it truly does not matter where such coordinate data came from (e.g., a GPS satellite, or converted from some other type of location data). What is important is the ability to compute distances between two different location reports and currently it is easiest if the location coordinates are in longitude/latitude coordinates. One could easily envision computing the distance between two different addresses in the U.S. and then converting both addresses to physical coordinates and then computing the difference between those physical coordinates. Hence, physical address coordinates (e.g., a chair on which the reader sits has a physical location) and logical address coordinates (e.g., the name of a computer/network, the name of a base station tower, etc. the user is connected to, may move in which case a translation to different physical coordinates is needed) may be considered by the invention.

The Location Tracking Database 120 stores the GPS coordinates (latitude and longitude) of each user. The database records have the following exemplary schema: location (user, device, timestamp, location) where user is a unique identifier for each user, device identifies the type and model of the user's wireless device, timestamp contains the date and time the data was captured, and location is the GPS coordinate pair.

The Communication Mechanism Finder 130 retrieves information from external sources and produces a list of alternate communication mechanisms in the user's vicinity. Sources such as local telephone directories, maps, and company listings (e.g., wireless equipment sellers) are used in the Finder 130.

The output of the Finder 130 contains information on the location of nearby pay phones, houses and other buildings, and locations offering wireless coverage and/or recharging facilities. The information is passed on to the Communication Mechanism Planner 140.

The Planner 140 is responsible for sorting the list of alternate communication mechanisms in order of importance. Only a limited amount of information can be transmitted to the user's wireless device, so only the most important alternate communication mechanisms are selected from the listing.

Some exemplary criteria used in the sorting include distance from user's current position, compatibility with user's wireless device (e.g., network type, voltage, connectors), accessibility of the alternate communication mechanism (e.g., facilities available at a post office are more accessible than those located inside a private home), fees charged for use of the alternate communication mechanism, and so forth.

Once the list is sorted, it is passed onto the Communication Mechanism Notifier 150.

The Notifier 150 transmits the list of alternate communication mechanisms to the user's wireless device 160. This can be in the form of text messages, graphics, or audio messages.

Figure 2:
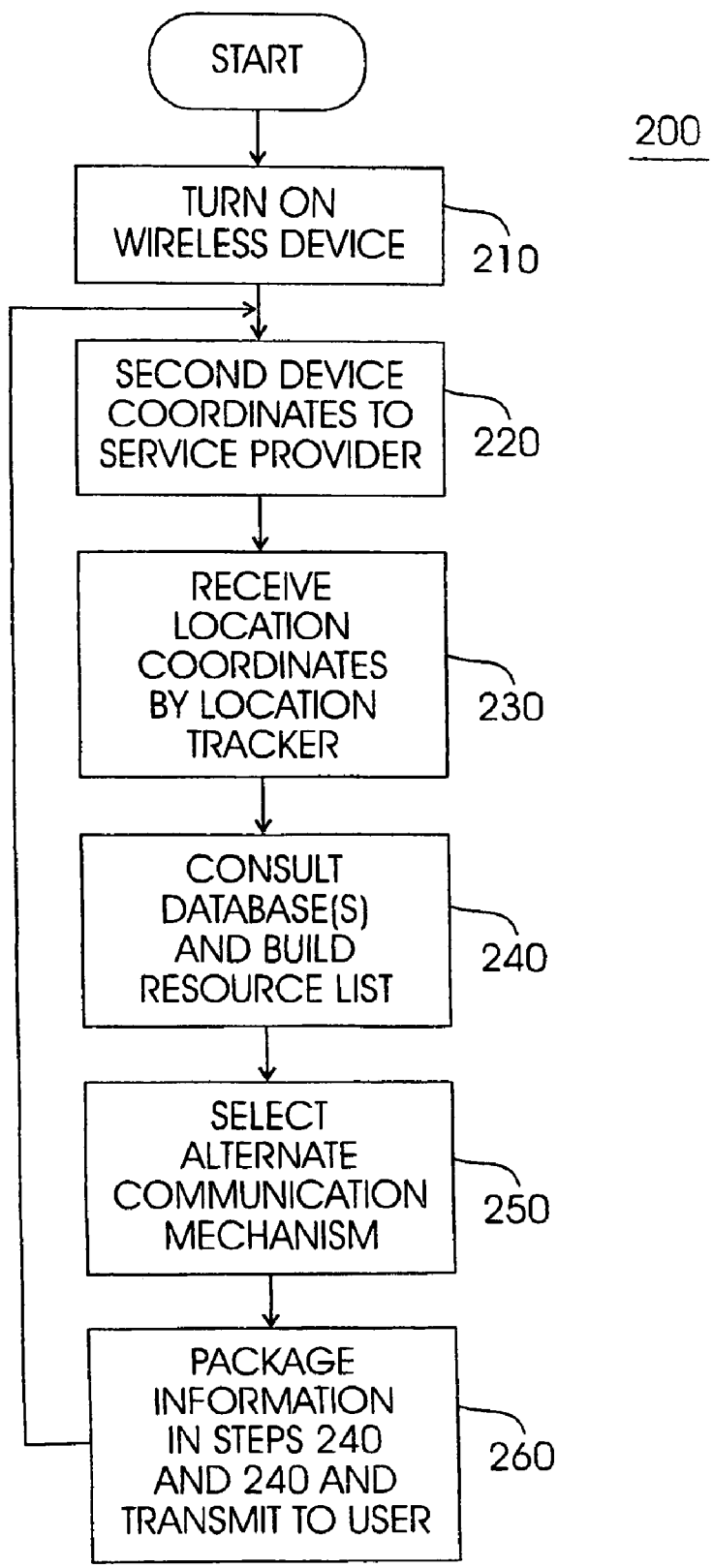
FIG. 2 is a flow diagram illustrating a preferred method 200 according to the present invention.

Turning now to FIG. 2, a flowchart of the inventive method 200 is shown. The data flow is substantially similar for both of the scenarios exemplarily described above.

In step 210, the user turns on a wireless device with GPS capability (or triangulation, or other location tracking method/scheme as described above; GPS will be assumed here for ease of discussion).

In step 220, the device sends GPS coordinates to a wireless service provider's server computer.

In step 230, a Location Tracker component of the server computer receives the GPS coordinates, and stores them in a Location Tracking Database.

In step 240, the Communication Mechanism Finder consults internal and external databases, and builds a list of resources that may assist the user (e.g., locations of pay phones, gas stations, cellular base stations, public facilities, etc.).

In step 250, the Communication Mechanism Planner selects the best alternate communication mechanism for the user (e.g., the nearest pay phone, nearest cell base station, nearest other facility, etc.). It also calculates distances to the locations that provide an alternate communication mechanism, and directions on how to get there.

In step 260, the communication Mechanism Notifier packages the information gathered in steps 240 and 240, and transmits it to the user's wireless device. Thereafter, the process loops back to step 220 and the process continues again.

It is noted that the information provided to the user can be text, image and/or audio information. Further, the information may include at least one of data which assists the user to continue to use the wireless device, data which assists the user in recovering from a failure of the wireless device, and data which allows continued optimal functioning of the wireless device.

For example, software/firmware upgrades (e.g., allowing for example a new ring tone from a Broadway/television show tune, etc. or a theme-based tune such as the Olympic tune, "Happy Birthday", etc.) may be downloadable by the user. Such may be downloadable via short message services (SMS) or the like.

Hereinbelow are described several scenarios of the invention.

Scenario A: Wireless Device Loses the Battery Power Necessary to Maintain Network Connection Every cellular phone user has probably experienced the situation where their phone has exhausted all (or nearly all) battery power, thereby making it impossible for the phone to be used for its intended purpose. What is needed in such a situation is either a) information that helps the user in finding an alternate communication device, such as a the nearest pay phone, or b) a facility for recharging the battery.

Peter A. is driving on a country road, and has a mechanical problem with his car. During the course of the day, Peter's cell phone had exhausted all battery power, leaving him unable to call for roadside assistance. However, during the time the cell phone was still operating normally, Peter's cell phone service provider had continuously tracked his location (via his GPS coordinates), and transmitted information on the nearest pay phone to his cell phone. Both the absolute location of the pay phone (address or facility) and relative location (how to get therefrom Peter's current position) are transmitted. The cell phone has an LCD display where this information is displayed, and so Peter is able to see that the nearest pay phone is in fact just half a mile down the road at a gas station. The LCD display consumes very little battery power (cf. digital wristwatches that operate for years), making it possible to display this information for extended periods of time, even after the phone has otherwise ceased to function as a phone.

Scenario B: Wireless Device Leaves Network Coverage Area

Even though cellular phone service providers have agreements in place that allow users to "roam" and use their phones outside their home networks, there are large areas of the country that have no network support. Some users might actually want to stay within their home network because it means not only lower call charges, but also that all extended services provided by their home network are available (e.g., text messaging, caller ID, etc.). Once a user leaves a network, there is very little they can do to regain network coverage besides moving to a location that has network coverage. What is needed is a way to tell the user where the nearest location with network coverage is.

Susan B. is driving on a country road and encounters two cars that have collided moments earlier. The LCD display on Susan's cell phone tells her that there is no cellular phone service in her current location, but that the last location where she did have network coverage was five miles earlier along that same road. The cell phone has this information because Susan's cell phone service provider had continuously tracked her location, and has transmitted the GPS coordinates of their nearest cellular base stations to her phone. Base stations that are within a certain radius from Susan's current position are included in the transmission. Therefore, even though Susan had not yet reached a small town along the road she was driving, her cell phone was able to tell her that the town has cellular phone service and is just 8 miles down the road.

Thus, the present invention would be extremely beneficial in each of the above exemplary situations. While the overall methodology of the invention is described above, the invention can be embodied in any number of different types of systems and executed in any number of different ways, as would be known by one ordinarily skilled in the art.

Figures 3, 4:
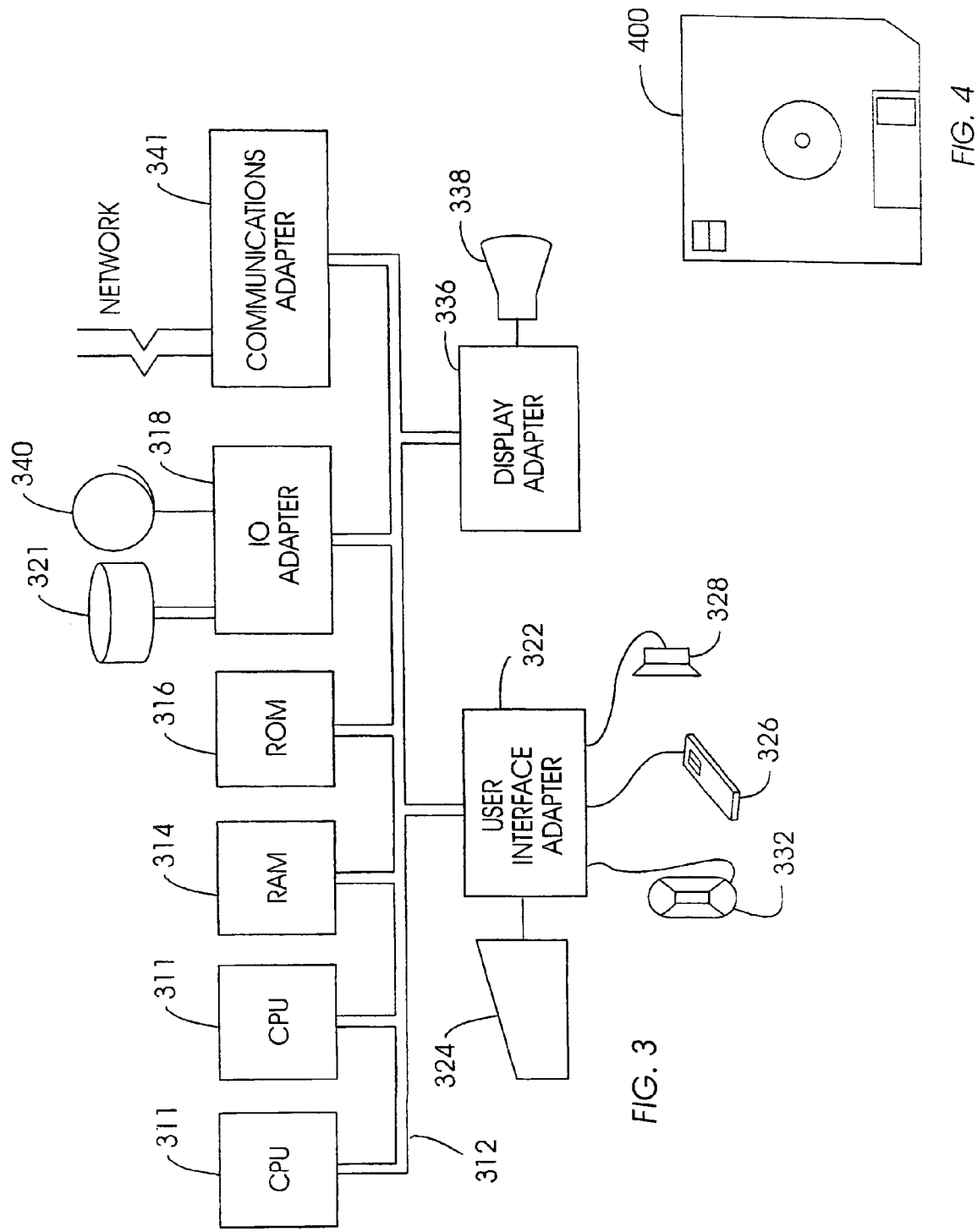
FIG. 3 illustrates an exemplary information handling/computer system for use with the present invention.
FIG. 4 illustrates a storage medium 400 for storing steps of the program for locating an alternate communication in the case of a failure of a wireless communication device.

For example, as illustrated in FIG. 3, a typical hardware configuration of an information handling/computer system for use with the invention, preferably has at least one processor or central processing unit (CPU) 311. The CPUs 311 are interconnected via a system bus 312 to a random access memory (RAM) 314, read-only memory (ROM) 316, input/output (I/O) adapter 318 (for connecting peripheral devices such as disk units 321 and tape drives 340 to the bus 312), user interface adapter 322 (for connecting a keyboard 324, an input device such as a mouse, trackball, joystick, touch screen, etc. 326, speaker 328, microphone 332, and/or other user interface device to the bus 312), communication adapter 334 (for connecting the information handling system to a data processing network such as an intranet, the Internet (World-Wide-Web) etc.), and display adapter 336 (for connecting the bus 312 to a display device 338). The display device could be a cathode ray tube (CRT), liquid crystal display (LCD), etc., as well as a hard-copy printer.

Such a method may be implemented, for example, by operating a computer, as embodied by a digital data processing apparatus, to execute a sequence of machine-readable instructions. These instructions may reside in various types of signal-bearing media.

Thus, as shown in FIG. 4, in addition to the hardware and process environment described above, a different aspect of the invention includes a computer-implemented method for locating an alternate communication mechanism in case of a failure of a wireless device, as described above. As an example, this method may be implemented in the particular hardware environment discussed above.

Such a method may be implemented, for example, by operating the CPU 311 (FIG. 3), to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 311 and hardware above, to perform a method of locating an alternate communication mechanism in case of a failure of a wireless device.

This signal-bearing media may include, for example, a RAM (not shown in FIG. 4) contained within the CPU 311 or auxiliary thereto as in RAM 314, as represented by a fast-access storage for example. Alternatively, the instructions may be contained in another signal-bearing media, such as a magnetic data storage diskette 400 (e.g., as shown in FIG. 4), directly or indirectly accessible by the CPU 311.

Whether contained in the diskette 400, the computer/CPU 311, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Thus, with the invention, as consumers begin to depend on wireless devices more and more, they will be assured that there is a "safety net" which allows use of alternate communication mechanisms if the wireless device fails. Hence, even if loss of network coverage or battery power occur suddenly and unexpectedly, an alternate communication mechanism can be found.

With the invention, such a mechanism is provided by proactively and continuously transmitting information to the wireless communication device that helps the user locate an alternate mechanism.

Hence, the invention benefits the user of a wireless device by creating a safety net that is used when the wireless device fails to operate due to loss of battery power, loss of wireless network coverage, or malfunction of the network itself. Under any of these conditions, the user will have continuously updated instructions on the wireless device that help that user in restoring wireless connectivity or finding an alternate communication mechanism. Instructions may include directions to a location where network coverage may be regained, battery power may be restored, or an alternate communication mechanism, such as a pay phone, may be found.

The continuous update mechanism can also be used to ensure continued, optimal operation of the device by loading updated configuration information or program code into the device. Cellular phones, for instance, may require periodic updates to their "firmware" to ensure their smooth operation.

While the invention has been described in terms of preferred embodiments, those skilled in the art will recognize that the invention can be practiced with modification within the spirit and scope of the appended claims.

What is claimed is:

1. A system for locating an alternate communication mechanism in case of a failure of a wireless device, comprising:
 a location tracker for continuously transmitting information to the wireless device for allowing a user to locate an alternate communication mechanism after the failure has occurred, and
 at least one of a display, on said wireless device, for allowing the wireless device to display said information, which was continuously transmitted from the location tracker and was received by said wireless device prior to the failure of said wireless device, and a speaker, on said wireless device, for allowing the wireless device to play audio information included in said information, which was continuously transmitted from the location tracker and was received by said wireless device prior to the failure of said wireless device,
 wherein said failure of said wireless device includes at least one of a loss of capability to perform an intended purpose of said wireless device, a loss of connection to a wireless network, a loss of wireless network coverage, a loss of battery power, a loss of adequate battery power necessary for communication, a loss of battery power necessary to maintain a network connection, and a loss of capability of the wireless device to transmit signals.

2. The system according to claim 1, wherein said information comprises at least one of textual information, audio information, and image information.

3. The system according to claim 1, wherein said information includes at least one of directions to a nearest pay phone, directions to at least one of a nearest house and a facility, and directions to at least one of a nearest location offering wireless coverage and recharging facilities.

4. The system according to claim 3, wherein said information comprises at least one of textual information, audio information, and image information.

5. The system according to claim 1, wherein said information comprises information which optimizes use of the wireless device.

6. The system according to claim 5, wherein said information comprises at least one of an upgrade of software used with the wireless device, billing information associated with the wireless device, and data associated with any of a network carrier and a manufacturer of said wireless device.

7. The system of claim 1, wherein said information comprises at least one of data which assists the user to continue to use the wireless device, data which assists the user in recovering from a failure of the wireless device, and data which allows continued optimal functioning of the wireless device.

8. The system of claim 7, wherein said information comprises at least one of textual information, audio information, and image information.

9. The system according to claim 1, further comprising:
 means for allowing the wireless device to display information that was received prior to the failure, wherein said information includes at least one of directions to a nearest pay phone, directions to at least one of a nearest house and a facility, and directions to at least one of a nearest location offering wireless coverage and recharging facilities.

10. The system according to claim 1, wherein a wireless network tracks a location of the user and transmits data to the wireless device, such that as the user moves, a location of the user is updated in a location database and information on alternate communication mechanisms is gathered and transmitted to the wireless device.

11. The system according to claim 1, further comprising:
a location tracking database for communicating with said location tracker.

12. The system according to claim 11, further comprising:
a communication mechanism finder coupled to receive an input from an external data source.

13. The system according to claim 12, further comprising:
a communication mechanism planner coupled to receive an output from said communication mechanism finder and said location tracking database.

14. The system according to claim 13, further comprising:
a communication mechanism notifier for receiving an output from said communication mechanism planner and for outputting a signal to said wireless device.

15. The system according to claim 1, wherein said location tracker is for retrieving location information of each user and storing said location information in a location tracking database.

16. The system according to claim 15, wherein the wireless device of the user periodically outputs global positioning satellite (GPS) coordinates to said location tracker, said information being marked with a timestamp and stored in said location tracking database.

17. The system according to claim 16, wherein said location tracking database stores the GPS coordinates of each user, records of said location tracking database having a schema of location (user, device, timestamp, location) where user is a unique identifier for each user, device identifies a type and model of the user's wireless device, timestamp contains a date and time the data was captured, and location is a GPS coordinate pair.

18. The system according to claim 17, wherein said communication mechanism finder retrieves information from an external source and produces a list of alternate communication mechanisms in a vicinity of said user,
wherein said source includes at least one of a local telephone directory, a map, and a company listing.

19. The system according to claim 18, wherein an output of the communication mechanism finder contains information on any of a location of a nearby pay phone, a house and an other building, a location offering wireless coverage, and a recharging facility, and
wherein said information is transmitted to a communication mechanism planner.

20. The system according to claim 19, wherein said planner is for sorting a list of alternate communication mechanisms in a predetermined order.

21. The system according to claim 20, wherein said predetermined order includes an order of importance, and wherein only a most important alternate communication mechanism is selected from the list.

22. The system according to claim 20, wherein said criteria used in the sorting include distance from a user's current position, compatibility with the user's wireless device, accessibility of the alternate communication mechanism, and fees charged for use of the alternate communication mechanism.

23. The system according to claim 20, wherein said list is sorted, and passed on to the communication mechanism notifier.

24. The system according to claim 23, wherein said notifier transmits the list of alternate communication mechanisms to the wireless device of the user.

25. A method for locating an alternate communication mechanism in case of a failure of a wireless device, comprising:
monitoring, by a wireless service provider, location coordinates of a wireless device of a user;
based on said location coordinates, consulting at least one database to find at least one candidate resource for assisting the user;
selecting a predetermined candidate resource from said at least one candidate resource to provide a best alternate communication mechanism for the user; and
forwarding said information to said wireless device of said user prior to said failure of said wireless device,
wherein said failure of said wireless device includes at least one of a loss of capability to perform an intended purpose of said wireless device, a loss of connection to a wireless network, a loss of wireless network coverage, a loss of battery power, a loss of adequate battery power necessary for communication, a loss of battery power resources necessary to maintain a network connection, and a loss of capability of the wireless device to transmit signals.

26. The method of claim 25, further comprising:
storing the location coordinates in a server computer.

27. The method of claim 25, further comprising:
calculating a distance and direction to a location that provides the best alternate communication mechanism.

28. The method of claim 25, wherein said information is displayed on said wireless device.

29. The method of claim 25, wherein said information is auditorily conveyed to said user.

30. The method of claim 25, wherein said predetermined candidate resource comprises a best candidate resource.

31. The method of claim 25, wherein said predetermined candidate resource comprises an optimum resource selected by a service provider of the wireless device.

32. A signal-bearing medium tangibly embodying a program of machine-readable instructions executable by a digital processing apparatus to perform a method for locating an alternate communication mechanism in case of a failure of a wireless device, comprising:
monitoring, by a wireless service provider, location coordinates of a wireless device of a user;
based on said location coordinates, consulting at least one database to find at least one candidate resource for assisting the user;
selecting a predetermined candidate resource from said at least one candidate resource to provide a best alternate communication mechanism for the user; and
forwarding said information to said wireless device of said user,
wherein said failure includes at least one of a loss of capability to perform an intended purpose of said wireless device, a loss of connection to a wireless network, a loss of wireless network coverage, a loss of battery power, a loss of adequate battery power necessary for communication, a loss of battery power resources necessary to maintain a network connection, and a loss of capability of the wireless device to transmit signals.

* * * * *